United States Patent Office 2,857,303
Patented Oct. 21, 1958

2,857,303

HEAT STABILIZED COPOLYMERIZATE OF A VINYLIDENE MONOMER AND AN UNSATURATED POLYESTER AND METHOD OF PREPARING AND USING SAME

Joseph F. Wilson, Bartlesville, Okla., assignor to Phillips Petroleum Company, a corporation of Delaware No Drawing. Application June 10, 1955
Serial No. 514,691

18 Claims. (Cl. 154—140)

This invention relates to a thermosetting resin and method of making same. In one of its aspects, this invention relates to thermosetting resins having exceptional heat distortion properties.

With the rapid growth of the plastic molding industry, there is a constant search for new and improved resins. It is known to prepare thermosetting resins by the polymerization of an unsaturated polyester resin with a polymerizable compound containing a $CH_2=C<$ group. Various types of monomers have been employed in conjunction with the unsaturated polyester resins. In particular, casting resins based on unsaturated polyesters often are prepared with a monomer having no conjugated double bonds in an aliphatic hydrocarbon group, in particular, styrene, to improve castability, cure performance, or rigidity of the cured resin. However, these resins are easily distorted by heat, say approaching sterilization temperature, and for this reason, their use has been limited.

It is an object of this invention to produce new polymerizable and polymerized compositions.

It is another object of this invention to provide a novel casting resin having excellent heat distortion properties.

Other objects and advantages of this invention will be apparent to those skilled in the art having been given this disclosure.

I have now found that thermosetting resins of exceptionally good heat distortion properties can be prepared by incorporating a balanced bifunctional polyhydroxy-polycarboxy substituted compound having a hydrocarbon ring as the nucleus into an unsaturated alkyd resin and copolymerizing the thus prepared alkyd resin with a monomer having a vinyl or alpha-methylvinyl group (isopropenyl group). By polyhydroxy-polycarboxy substituted compound having a hydrocarbon ring as the nucleus, I mean such substituted aromatic or saturated alicyclic compounds.

Unsaturated polyesters herein refer to a polyester formed by the esterification of a polyalcohol with one or more aliphatic dibasic acids of which at least 20 mol percent of the dibasic acid constituents are alpha, beta-unsaturated polycarboxylic acids of the aliphatic series. These copolymers are cross-linked, tridimensional resins which are useful as casting resins, the impregnation of sheet materials and for the production of laminated products. By the modification of these resins, as is taught by this disclosure, these materials are suitable for the above uses but have the additional advantage of being useful at elevated temperatures.

In the preparation of the composition of this invention, the bifunctional compound can be added at any time prior to the copolymerization with the vinyl monomer. For example, the bifunctional compound can be added prior to the esterification reaction, during the esterification reaction, or at the completion of the esterification reaction. In the preparation of the composition of this invention, it is preferred to carry out the esterification of the polyhydric alcohol to an acid number of less than 50 (mg. KOH/gm. of sample) prior to copolymerizing the unsaturated polyester with the vinyl monomer. Since the bifunctional compound is balanced, i. e., has an equal number of hydroxy and carboxy groups, any amount of this balanced material can be incorporated into the polyester formulation without upsetting the desired balance of hydroxy and carboxy groups in the recipe. The esterification of the polyester reactants can thus be carried out without upsetting the desired acid number by known methods of polyester preparation. Although any amount of the bifunctional compound can be added during the formulation of the unsaturated polyester here, it is preferred to use not more than five percent by weight (of total reactants) of the bifunctional compound since greater amounts tend to cause rapid gelling of the polyester. Since the polyester is to be subsequently copolymerized with a monomer, this gel formation is undesirable. After the copolymerization step, the composition is ready for molding, casting, extruding, production of laminates, etc. Curing, by application of heat, is then effected to give a thermoset product.

The composition can be cured at a temperature in the range of 25 to 200° C., with a temperature in the range of 50 to 150° C. giving very good results. Wherein the material is used for forming fabric laminates, better wetting of the fabric is frequently obtained if the composition is allowed to stand at room temperature for a period of time up to five hours or even more prior to raising the temperature to the desired curing level. It will be understood by the polymer chemist that the cure time will vary, depending upon the composition, the temperature, and the catalyst. Under some conditions, cure time can be as short as 10 minutes, while under different conditions, the cure time can be 100 hours or even more.

The blended compositions, prior to curing, range from quite fluid to viscous liquids, or soft, pasty materials. Frequently, a polymerization inhibitor is incorporated in the polymerizable materials prior to blending, since polymerization of these materials will sometimes occur at room temperature within a comparatively short time and premature polymerization would result in the absence of these inhibitors. Inhibitors, such as phenyl-beta-naphthylamine, hydroquinone, tert-butyl catechol, resorcinol, and the like, are suitable. These inhibitors are employed in small amounts, generally less than 1 percent by weight, based on the total composition, and frequently between 0.01 and 0.2 weight percent is considered sufficient.

These inhibitors are not necessarily removed prior to blending. The effect of the inhibitor carried over into the blend may be overcome by the addition of a catalyst and a promoter. Promoters include materials such as metal salts, e. g., cobalt, iron, manganese, or lead in the form of naphthenates or other salts. Other promoters include amine-type compounds such as ethanolamine, diethanolamine, triethanolamine, diethylenetriamine, tributylamine, and the like.

In addition to the promoter, catalysts are generally employed. These catalysts are generally of the peroxide type, such as benzoyl peroxide, tert-butyl perbenzoate, tert-butyl hydroperoxide, cumene hydroperoxide, cyclohexanone peroxide, etc. The catalyst is generally added to the composition just prior to the processing step, such as molding, casting, etc.

The amount of catalyst employed is such that the composition will remain fluid for the length of time required for the processing step. Whatever catalyst is chosen, the amount used is that which will give the desired gel time. Those skilled in the art will be familiar with such methods. Gel time desired will, of course, depend upon the conditions under which the composition is used. The composition should remain fluid for a time sufficient to form the article or coat the fabric, etc., and the time will be different, say for a laminate than it would for a molded article. In general, the amount of catalyst is regulated to give a gel time between 1 and 30 minutes.

The unsaturated polyester resins useful in this invention are prepared by the reaction of polyhydric alcohols with unsaturated polycarboxylic acids and are preferably produced by the esterification of an alpha, beta unsaturated dicarboxylic acid with a glycol. These resins generally will have a molecular weight not in excess of 8,000, however, those resins having higher molecular weights can be used.

The polyester resin has at least 0.5 weight percent based on the resin of a bifunctional compound, defined below, incorporated therein with the range generally having from 0.5 to 5 weight percent. The amount of this mixture used to form the composition of this invention will usually be in the range of 10 to 90 parts by weight per 100 parts of total polymerizable material and more preferably between 30 and 80 parts by weight. The remaining polymerizable material is a vinyl monomer as is defined below.

The polyhydric alcohols with which we are primarily concerned are glycols or mixtures of glycols (two hydroxy groups per molecule) and they will generally contain no more than 15 carbon atoms per molecule. Examples of such glycols include ethylene glycol, propylene glycol, diethylene glycol, alpha-butylene glycol, beta-butylene glycol, tetramethylene glycol, triethylene glycol, hexamethylene glycol, diphenyl propane diol, etc. Also included in such glycols are those glycols which are derivatives of polyhydroxy alcohols containing 3 or more hydroxy groups wherein the hydroxy groups in excess of 2 have been reacted, such as by esterification or etherification, with a saturated monocarboxylic acid, for example, acetic acid. Small amounts of more highly hydroxylated materials, e. g., compounds containing up to six hydroxy groups per molecule, can be present and will be desirable in some instances. Examples of such alcohols containing three or more hydroxy groups include glycerol, erythritol, pentaerythritol, ribitol, sorbitol, allitol, inositol, scyllitol, etc. These latter polyhydric alcohols can comprise up to 5 percent of the total polyhydric alcohol without any adverse effects. Alcohols containing only one hydroxy group per molecule can also be present, but it is to be understood that the total amount of alcohol other than glycols is not generally used in an amount exceeding 5 weight percent of the total alcohol. Examples of such mono hydroxy alcohols include methyl alcohol, ethyl alcohol, n-propyl alcohol, isopropyl alcohol, sec-butyl alcohol, tert-butyl alcohol, isoamyl alcohol, octyl alcohol, myristyl alcohol, benzyl alcohol, cyclohexanol, furfuryl alcohol, etc.

When the more highly hydroxylated compounds are used, the polyester resins have a tendency to gel and it is, therefore, generally desirable to keep these materials at a minimum, i. e., not over 5 weight percent. On the other hand, the monohydric alcohols serve as chain terminators, and if used in too large quantities, will give products with undesirably low molecular weights and for this reason, are not generally used in quantities exceeding 5 weight percent of total alcohols.

The polycarboxylic acids with which this invention is primarily concerned are unsaturated dicarboxylic acids, preferably alpha, beta-unsaturated dicarboxylic acids generally containing not more than 15 carbon atoms per molecule. Such acids include maleic, fumaric, itaconic, citraconic, mesaconic, ethylmaleic, methylethylmaleic, diethylmaleic, glutaconic, alpha-methylglutaconic, alpha, alpha'-dimethylglutaconic, beta-methylglutaconic, alpha, alpha-dimethylglutaconic, alpha, beta, gamma-tributyl-glytaconic, 1,2-dihydromuconic, 2-octenedioic, 2-heptenedioic, 2-pentadecenedioic, and similar dicarboxylic acids. Also included in such polycarboxylic acids are those dicarboxylic acids which are derivatives of polycarboxylic acids of more than 2 carboxy groups wherein the carboxy groups in excess of 2 have been reacted such as having been reacted with a monohydric alcohol. In addition to the unsaturated dicarboxylic acids, certain modifying acids can be used. These modifying acids will generally contain no more than 20 carbon atoms per molecule and include saturated dicarboxylic acids, saturated or unsaturated monocarboxylic acids, tricarboxylic acids, aromatic mono- and polycarboxylic acids. In the case of the saturated dicarboxylic acids, they can be used in an amount up to and including 25 weight percent of the total acid, provided that the total of all modifying acids (i. e., those other than alpha, beta-unsaturated dicarboxylic acids) do not exceed this 25 percent limitation. In the case of all other modifying acids, the amount will generally not exceed about 5 weight percent. Examples of these other modifying acids include phthalic, terephthalic, mellitic, tricarballylic, formic, acetic, propionic, butyric, isobutyric, valeric, caprylic, pelargonic, capric, myristic, stearic, arachidic, oleic, acrylic, ethacrylic, benzoic, toluic and salicyclic acids.

Like the alcohols, the polycarboxylic acids containing more than 2 carboxy groups tend toward gel formation, whereas the monocarboxylic acids are chain breakers.

It is within the scope of this invention to use a mixture of alcohols and a mixture of acids or a mixture of either. In general, the acids and alcohols selected will be so chosen so as to produce polyester resins having a molecular weight no greater than 8000. It is also within the scope of this invention to halogenate or substitute other non-interfering groups on the polyester resin.

The monomeric material copolymerizable with the polyester and the balanced bifunctional compound and which are applicable in this invention are those monomers containing a $CH_2=C<$ group but containing no conjugated aliphatic carbon-to-carbon double bonds. That is, the resins of this invention have high flexural strengths, while those monomers containing aliphatic conjugated carbon-to-carbon double bonds tend to form elastomers rather than the more rigid products of this invention. By having no conjugated aliphatic carbon-to-carbon double bonds, it is meant that no groups of the following type are included: $—C=C—C=C—$ in an aliphatic chain. To say it another way, the $CH_2=C<$ group is an active polymerizable group in which the double bond is not in conjugated relation to a second aliphatic carbon-to-carbon double bond. In general, this third type monomer will be selected from the group consisting of aromatic hydrocarbons having at least one $CH_2=C<$ substituent and nonconjugated substituted aliphatic copolymerizable monomers having at least one $CH_2=C<$ group. Typical monomers include styrene, chlorostyrene, dichlorostyrene, alkylstyrene, alphamethylstyrene, vinyl naphthalene, diallyl phthalate, diallyl maleate, diallyl fumarate, diallyl succinate, ethyl vinyl ether, diallyl ether, methallyl ethyl ether, methyl vinyl ketone, divinyl ketone, methyl allyl ketone, methyl acrylate, ethyl acrylate, methyl methacrylate, acrylonitrile, methacrylonitrile, and the like.

The balanced bifunctional polyhydroxy-polycarboxy ring nuclear compounds applicable in this invention are preferably cyclic aliphatic compounds containing 5 or 6 carbon atoms per molecule, i. e., cyclopentane and cyclohexane, substituted with two hydroxy groups and two carboxy groups. However, aromatic nuclear poly-hydroxy-polycrboxy compounds are also applicable. It is also within the scope of this invention to use ring nuclear bifunctional compounds containing more than 2 hydroxy and 2 carboxy groups so long as the number of hydroxy groups equals the number of carboxy groups. I have also found that the anhydride of the compounds are equally applicable. As has been indicated, I prefer the dihydroxy-dicarboxy cyclopentane and cyclohexane compounds and their anhydrides, and, in particular, I prefer 4,5-dihydroxycyclohexane-1,2- dicarbovylic acid and its anhydride. These compounds can be substituted on other ring carbon atoms by non-interfering groups such as alkyl groups, halogens, etc. Examples of such compounds include: 3,4-dihydroxycyclopentane-1,2-dicarboxylic acid, 3,5-dihydroxycyclopentane-1,2-dicarboxylic acid, 4,5-dihydroxycyclohexane-1,2 - dicarboxylic acid, 4,5,6 - trihydroxycyclohexane-1,2,3-tricarboxylic acid, 4,6-dihydroxycyclohexane-1,3-dicarboxylic acid, 2,3-dihydroxycyclohexane-1,4-dicarboxylic acid, 4,5-dihydroxy-3-chlorocyclopentane-1,2-dicarboxylic acid, 4,5-dihydroxy-3-butylcyclohexane-1,2-dicarboxylic acid, 4,5-dihydroxyphthalic acid, 4,6-dihydroxyisophthalic acid, 2,3-dihydroxyterephthalic acid, 4,5-dihydroxy-3-bromophthalic acid, 6,7-dihydroxynaphthalene-2,3-dicarboxylic acid, 5,8-dihydroxy-naphthalene-1,4-dicarboxylic acid, and the anhydrides of the above.

To further explain my invention and to illustrate its advantages, the following examples are given. To be comparative, a single standard commercial unsaturated polyester resin recipe was selected as the base recipe or control, and various modifying agents were tested and compared to a preferred compound of this invention. As has been stated, the anhydrides have been found equivalent to the acids and can be substituted therefor, and vice versa in the recipes. The 4,5-dihydroxycyclohexane-1,2-dicarboxylic acid can be prepared by the method shown in the copending application of J. T. Edmonds, Jr., having Serial Number 341,623, filed March 10, 1953. According to that application, 4-cyclohexane-1, 2-dicarboxylic acid and its anhydride is obtained by reacting 1,3-butadine with maleic anhydride according to the well-known Diels-Alder reaction. Thus, 4-cyclohexane-1,2-dicarboxylic acid can then be reacted with hydrogen peroxide or a compound capable of yielding hydrogen peroxide, in the presence of a catalyst, such as formic acid, at a temperature in the range of 40 to 100° C. for a period in the range of 1 to 20 hours at a pressure sufficient to maintain the reactants in the liquid phase to form the 4,5-dihydroxycyclohexane-1,2-dicarboxylic acid.

As has been said, the 4,5-dihydroxycyclohexane-1,2-dicarboxylic acid, its anhydride, and this compound substituted with non-interfering substituents are particularly valuable in the resin of this invention, however, the other balanced bifunctional polyhydroxy-polycarboxy substituted ring compounds are also useful.

EXAMPLE I

Polyester resins containing various modifiers were prepared and subsequently copolymerized with styrene by the following procedure:

A standard commercial unsaturated polyester resin recipe was selected as the base recipe or control, and various modifying agents were tested to determine their effect on the heat distortion property of the copolymer of the unsaturated polyester or modified unsaturated polyester resin with styrene. The standard base recipe used was:

*Standard recipe*

| Material | Grams | Mol. Weight | Mols. |
|---|---|---|---|
| Maleic anhydride | 64 | 98 | 0.65 |
| Adipic acid | 19 | 146 | 0.13 |
| Diethylene glycol | 84 | 106 | 0.79 |
| Hydroquinone | 0.1 | (Stabilizer) | |

Thus, the mol ratio in the above recipe is 6 mols diethylene glycol; 5 mols maleic anhydride; 1 mol of adipic acid.

Using the above base recipe, four different polyesters were prepared to determine the effect of modifiers. These runs are defined as follows:

*Run 1.*—Standard recipe ingredients only (control).
*Run 2.*—Standard recipe ingredients plus phthalic anhydride in the amount of four percent by weight of total ingredients (6.7 grams). This polyester was not balanced since it contained excess acid groups due to the added phthalic anhydride.

*Run 3.*—Standard recipe ingredients plus four weight percent phthalic anhydride (6.7 grams) plus 3.0 grams additional diethylene glycol to balance the added acid.
*Run 4.*—Standard recipe ingredients plus four weight percent (6.7 grams) of 4,5-dihydroxycyclohexane-1,2-dicarboxylic acid.

The above defined polyesters were prepared by the following procedure. All of the ingredients were added cold to a three-necked flask fitted with a heating mantle, a water-cooled trap condenser, a stirrer, and a nitrogen inlet tube. The mixture was then heated to cause esterification to take place. The system was purged continuously with nitrogen during the esterification. The water formed in the esterification was taken off overhead in the trap condenser. Heating was continued until the acid value was less than 50 (milligram KOH/gm. of sample) except in run 2 where the excess phthalic anhydride kept the acid number high. After the esterification had taken place, the mixture was cooled to about 130–140° C. (below the boiling point of styrene), and freshly distilled styrene was added to the mixture. The resulting mixture was stirred until homogeneous, drained, and poured into bottles for storage. The styrene content and acid numbers are tabulated below:

TABLE I

| Run No. | Styrene Content (percent by weight) | Acid Number Before Styrene Addition (mg. KOH/gm. Sample) |
|---|---|---|
| 1 | 39 | 28 |
| 2 | 34 | 70 |
| 3 | 34 | 39 |
| 4 | 37 | 27 |

The resins as prepared above were polymerized by the following procedure. The desired amount of resin was weighed out and polymerized using benzoyl peroxide catalyst by adding two percent by weight benzoyl peroxide dissolved in 1–2 mls. of styrene, stirring the mixture and pouring into a suitable mold. The mold was then placed in an oven and the resins heated for one hour at 60° C., two hours at 65° C., and three hours at 70° C., or until the resin had gelled. After the resin had set, they were further cured by heating at 110° for 24 to 48 hours.

The copolymers as prepared above were tested for heat distortion properties according to the method of ASTM–D648–45T. The results of these tests are expressed below in Table II.

TABLE II

| Polyester Run No. | Heat Distortion Temp., °F. |
|---|---|
| 1 (Control) | 192 |
| 2 | 198 |
| 3 | 212 |
| 4 (Composition of this invention) | 261.5 |

The resin which was modified with 4,5-dihydroxycyclohexane-1,2-dicarboxylic acid by the method of this invention was further tested to determine the effect of the modifier on water absorbency and hardness of the cast polymers. The results of these tests are shown in Table III.

TABLE III

| Run No. | 48-Hour Water Absorbency, Wt. Percent Increase | Shore Hardness |
|---|---|---|
| 1 (Control) | 0.59 | D–82 |
| 4 (Invention) | 0.58 | D–85 |

From the above data, it can be seen that the alkyd resin modified by the method of this invention is much superior in heat distortion properties than are the resins of the prior art, and that the resin is at least equal to the prior art resin in water absorbency properties and in hardness. Articles prepared from the resin of this invention can be sterilized by boiling in water or otherwise by heat without distorting the article shape, making such articles useful where the prior art resin could not be used.

In the example, the modifying balanced-bifunctional compound was added to the unsaturated acid and glycol mixture before esterification, however, the material could have been added at the end of the esterification period.

As has been indicated, the composition of this invention is useful for molding, casting, forming laminates, etc. The material when so used generally will have a polymerization catalyst of the class indicated (supra) incorporated therein and the resulting blend cast into suitable molds, coated onto fabric such as fibre glass, cloth, etc., and the composition cured at a temperature in the range of 25 to 200° C., and more generally in the range of 50 to 150° C. for a period of time sufficient to cause a set. In the case of laminates, each sheet of the material being laminated is coated on a plurality of these sheets, will be stacked one on the other and pressed together. The curing is generally carried out while the sheets are being so pressed.

I claim:

1. A composition of matter stabilized against heat distortion comprising the polymerized product of an unsaturated polyester resin prepared by esterification of a dihydric alcohol and an aliphatic ethylenic unsaturated dicarboxylic acid, a polyhydroxy-polycarboxy substituted hydrocarbon ring compound wherein the hydroxy and carboxy substituents each do not exceed 3 and are equal in number and a vinylidene monomer free of aliphatic conjugated double bonds copolymerizable with said polyester resin.

2. The composition of claim 1 wherein the polyhydroxy-polycarboxy substituted ring compound is present in the range 0.5 to 5 weight percent based on the weight of the esterification product.

3. A polymeric composition of matter comprising (A) 10 to 90 weight parts of polymer of an unsaturated polyester resin having a maximum molecular weight of 8,000, said resin comprising the esterification product of a glycol containing a maximum of 15 carbon atoms per molecule and wherein such glycols comprise at least 95 weight percent of the alcohols in preparing said resin and an alpha, beta-ethylenic unsaturated aliphatic dicarboxylic acid wherein such alpha, beta-dicarboxylic acids comprise at least 20 weight percent of the acids in preparing said resin, and wherein said resin has incorporated therein 0.5 to 5 percent based on said resin of a polyhydroxy-polycarboxy substituted hydrocarbon ring compound wherein the hydroxy and carboxy substituent each do not exceed 3 and are equal in number; and (B) 10 to 70 weight parts of a vinylidene monomer free of aliphatic conjugated double bonds copolymerizable with said polyester resin.

4. The composition of claim 3 wherein the nucleus in the polyhydroxy-polycarboxy substituted ring compound is selected from the group consisting of the benzene nucleus, the naphthalene nucleus, the cyclopentane nucleus and the cyclohexane nucleus.

5. The composition of claim 3 wherein the nucleus in the ring compound is the cyclohexane nucleus.

6. The composition of claim 5 wherein the polyhydroxy-polycarboxy substituted ring compound is 4,5-dihydroxycyclohexane-1,2-dicarboxylic acid.

7. A resin forming composition comprising 30 to 80 weight parts per 100 parts of total polymerizable material of an unsaturated polyester resin of a glycol and an ethylenic unsaturated aliphatic dicarboxylic acid having incorporated therein 0.5 to 5 weight parts per 100 parts of said unsaturated polyester of a dihydroxy-dicarboxy-substituted hydrocarbon ring compound, said ring compound being selected from the group consisting of benzene, naphthalene, cyclopentane and cyclohexane, and the remaining copolymerizable material free of aliphatic conjugated double bonds copolymerizable with said polymerizable with said polyester resin.

8. The composition of claim 7 wherein the dihydroxy-dicarboxy-substituted ring compounds is 4,5-dihydroxy-cyclohexane-1,2-dicarboxylic acid.

9. A method of preparing a thermoset polymeric composition of superior heat distortion properties which comprises incorporating a polyhydroxy-polycarboxy substituted hydrocarbon ring compound wherein the hydroxy and carboxy substituents each do not exceed 3 and are equal in number into a polyester resin formed by esterifying a glycol with an ethylenic unsaturated dicarboxylic acid, mixing the resulting composition with a vinylidene monomer free of aliphatic conjugated double bonds copolymerizable with said polyester resin and copolymerizing the resulting blend.

10. A method of preparing a cast thermoset polymeric article of high resistance to heat distortion which comprises blending (A) 10 to 90 weight parts per 100 parts of coreactive materials of a blend comprising (1) an unsaturated polyester resin having a molecular weight not in excess of 8,000, said resin comprising the esterification product of a glycol containing not more than 15 carbon atoms per molecule and wherein such glycols comprise at least 95 weight percent of the alcohols in preparing said resin and an alpha, beta-ethylenic unsaturated aliphatic dicarboxylic acid wherein such alpha, beta-dicarboxylic acids comprise at least 75 weight percent of the acid in preparing said resin and (2) 0.5 to 5 weight parts per 100 parts of said polyester resin of a polyhydroxy-polycarboxy-substituted hydrocarbon ring compound wherein said hydrocarbon ring is selected from the group consisting of the benzene ring, the naphthalene ring, the cyclopentane ring, and the cyclohexane ring and wherein the hydroxy and carboxy substituents each do not exceed 3 and are equal in number with (B) 90 to 10 parts of a vinylidine monomer free of aliphatic conjugated double bonds copolymerizable with said polyester resin; incorporating a polymerization catalyst in the resulting blend of A plus B as the last ingredient; molding the resulting blend; and subjecting the molded blend to a curing temperature for a time sufficient to cause said blend to set.

11. A method of preparing a thermoset laminate of high resistance to heat distortion which comprises blending 10 to 90 weight parts per 100 parts coreactive materials of a polyester resin of a dihydric alcohol and an ethylenic unsaturated dicarboxylic acid modified with at least 0.5 part per 100 parts of said polyester resin of a polyhydroxy - polycarboxy - substituted hydrocarbon ring wherein the hydroxy and carboxy substituents each do not exceed 3 and are equal in number with 90 to 10 weight parts per 100 parts coreactive materials of a vinylidene monomer free of aliphatic conjugated double bonds copolymerizable with said polyester resin; coating a plurality of fabric sheets with the blend containing the compounding ingredient; forming a plurality of plies of said coated fabric sheets; and subjecting the formed plies to a temperature in the range 25 to 200° C. for a time sufficient to cause said blend to set.

12. A method of preparing a thermoset plastic article having a high resistance to heat distortion which comprises esterifying a glycol with an ethylenic unsaturated aliphatic dicarboxylic acid in the presence of 0.5 to 5 weight parts per 100 parts of said glycol plus said acid of a polyhydroxy-polycarboxy-substituted hydrocarbon ring compound wherein the hydroxy and carboxy substituents each do not exceed three and one equal in number to form a polyester resin; blending 10 to 90 weight parts per 100 parts coreactive material of the said polyester resin with a copolymerizable vinylidene monomer free of aliphatic conjugated double bonds; incorporating a polymerization catalyst and a polymerization promoter into said blend; forming said article; and subjecting the formed article to a temperature in the range 25 to 200° C. for a time sufficient to cause said article to set.

13. The method of claim 12 wherein the hydrocarbon ring is selected from the group consisting of the benzene ring, the naphthalene ring, the cyclopentane ring and the cyclohexane ring.

14. The method of claim 12 wherein the hydrocarbon ring is the cyclohexane ring.

15. The method of claim 12 wherein the polyhydroxy-polycarboxy-substituted hydrocarbon ring compound is 4,5-dihydroxycyclohexane-1,2-dicarboxylic acid.

16. The method of claim 15 wherein the dicarboxylic acid is an alpha-,beta-unsaturated acid and the copolymerizable monomer is styrene.

17. A composition of matter comprising the copolymerized product of (A) 10 to 90 weight parts per 100 parts of copolymerizable material of a glycol esterified with aliphatic dibasic acids wherein aliphatic alpha, beta-ethylenic-unsaturated acids comprise at least 75 weight percent of such dibasic acids, the resulting esterification product being modified with 0.5 to 5 weight percent based on said esterified product of 4,5-dihydroxy-cyclohexane-1,2-dicarboxylic acid and (B) a vinylidene monomer free of aliphatic conjugated double bonds copolymerizable with said esterification product.

18. The composition of claim 17 wherein the glycol is diethylene glycol, the aliphatic alpha, beta-unsaturated acid is maleic anhydride, and the copolymerizable monomer is styrene.

References Cited in the file of this patent
UNITED STATES PATENTS

| | | |
|---|---|---|
| 2,556,739 | Moore et al. | Sept. 4, 1951 |
| 2,607,756 | Anderson | Aug. 19, 1952 |
| 2,683,131 | Cass | July 6, 1954 |